United States Patent
Howard et al.

(10) Patent No.: US 11,664,131 B2
(45) Date of Patent: May 30, 2023

(54) NUCLEAR REACTOR FLOW CALMING ASSEMBLY

(71) Applicant: Electricite de France, Paris (FR)

(72) Inventors: Richard Howard, Paris (FR); Tingting Xu, Beijing (CN); Serge Bellet, Caluire et Cuire (FR)

(73) Assignee: Electricite de France

( * ) Notice: Subject to any disclaimer, the term of this patent is extended or adjusted under 35 U.S.C. 154(b) by 18 days.

(21) Appl. No.: 16/954,716

(22) PCT Filed: Dec. 18, 2018

(86) PCT No.: PCT/FR2018/053389
§ 371 (c)(1),
(2) Date: Jun. 17, 2020

(87) PCT Pub. No.: WO2019/122699
PCT Pub. Date: Jun. 27, 2019

(65) Prior Publication Data
US 2020/0388408 A1 Dec. 10, 2020

(30) Foreign Application Priority Data
Dec. 19, 2017 (FR) ........................... 1762458

(51) Int. Cl.
*G21C 15/00* (2006.01)
*G21C 13/02* (2006.01)

(52) U.S. Cl.
CPC ............. *G21C 15/00* (2013.01); *G21C 13/02* (2013.01)

(58) Field of Classification Search
CPC ........ G21C 13/02; G21C 3/322; G21C 15/02; G21C 15/14; G21C 15/243; G21C 15/24
See application file for complete search history.

(56) References Cited

U.S. PATENT DOCUMENTS

| | | | |
|---|---|---|---|
| 2,990,349 A | 6/1961 | Roman | |
| 2011/0150163 A1* | 6/2011 | Bausch | C10M 173/02 376/267 |

FOREIGN PATENT DOCUMENTS

| | | | |
|---|---|---|---|
| CN | 103971763 A | 8/2014 | |
| WO | 2013159438 A1 | 10/2013 | |
| WO | WO-2013159438 A1 * | 10/2013 | ............. G21C 15/02 |

OTHER PUBLICATIONS

International Search Report for PCT/FR2018/053389 dated Apr. 11, 2019; 2 pages.

* cited by examiner

*Primary Examiner* — Jack W Keith
*Assistant Examiner* — Joshua C Devorkin
(74) *Attorney, Agent, or Firm* — Lerner David LLP

(57) ABSTRACT

A nuclear reactor includes a vessel having an outer wall and vessel bottom, and an enclosure delimited by a cylindrical inner wall disposed inside the vessel such that the inner wall and outer wall define a circuit with an annular cross-section. A support element is located adjacent the bottom of the enclosure to hold control elements of the core. A flow diffusion element is positioned between the support element and the vessel bottom and has a circular flat surface portion including disc shaped orifices of the same diameter. The space between the flat portion and the vessel bottom forms an unobstructed mixing zone to allow uniform distribution of flow rates of fluid circulated through the enclosure.

9 Claims, 3 Drawing Sheets

NUCLEAR REACTOR FLOW CALMING ASSEMBLY

CROSS-REFERENCE TO RELATED APPLICATIONS

The present application is a national phase entry under 35 U.S.C § 371 of International Application No. PCT/FR2018/053389 filed Dec. 18, 2018, which claims priority from French Application No. 1762458 filed Dec. 19, 2017, all of which are hereby incorporated herein by reference.

GENERAL TECHNICAL FIELD AND PRIOR ART

The field of the invention is that of nuclear reactors.

The present invention relates to the flows in the vessel of second or third generation pressurised water reactors of nuclear power plants, for which the core is cooled using a heat transfer fluid that circulates through the core.

Conventionally, such systems comprise a core 1, comprising nuclear fuel elements, immersed in a heat transfer fluid driven in circulation so as to carry out a heat exchange with said core.

The core 1 is conventionally contained in a vessel 2, shown in FIG. 1, in which the heat transfer fluid circulates.

The vessel 2 is delimited by a substantially cylindrical outer wall 3, with the lower end of the vessel 2 being closed by a vessel bottom 4.

Conventionally, the vessel bottom 4 has a substantially hemispherical shape.

An inner enclosure 5 is located inside the vessel 2.

The inner enclosure 5 is delimited by a substantially cylindrical inner wall 6 open at the lower end thereof.

The inner wall 6 and the outer wall 3 delimit an injection circuit 7, the injection circuit 7 having a substantially annular cross-section.

The core 1 is conventionally located inside the inner enclosure 5.

The heat transfer fluid conventionally circulates in the injection circuit 7 from top to bottom, then is returned at the vessel bottom 4 to circulate in the inner enclosure 5 from bottom to top, carrying out the heat exchange with the core 1.

The returning of the heat transfer fluid at the vessel bottom 4 causes a heterogeneous distribution of flow rates over the cross-section of the inner enclosure 5, typically a strong overflow at the centre (15 to 20% of the average flow rate) and an underflow at the periphery (of the same order of magnitude as the overflow).

A heterogeneous flow at the inlet of the core 1 modifies the operation of the core 1.

This heterogeneity on the supply causes so-called transversal flows that progressively make the distribution of flow rates uniform starting from about one-fourth the height of the core 1.

These transversal currents are caused by a physical balance linked to the pressure, but cause hydraulic excitations that induce vibrations of the fuel rods.

The fluctuations, linked to the high rate of turbulence that the flow encounters in order to be returned, exacerbate the excitation of the fuel assemblies.

Using reactors is then penalised by wear caused by fretting (it is understood that fretting means all of the physical phenomena of wear, deformation, oxidation, corrosion, cracking, adhesion or other physical-chemical, electrochemical and structural modifications of the material when two surfaces of the same nature or not are in contact) of the rods but also by deformations of assemblies.

These heterogeneities in supply therefore result in a degradation in the thermohydraulic and neutron behaviour of the assembly, on the mechanical stresses and this have an incidence on the yield and the service life of an assembly.

The axial maintaining of the fuel assemblies with respect to the momentum caused by the flow of the fluid is therefore determining for the maximum allowed value for the thermohydraulic flow rate.

The minimum value of the flow rate is associated with the cooling function of the core 1, the temperature of the core 1 having to be maintained below a certain threshold in order to prevent damage to the core 1.

An excessively abrupt change in the cross-section at the outlet of the annular space to the vessel bottom is one of the main sources of these flow rate heterogeneities in the inner enclosure 5.

Conventionally, these disadvantages are limited by operating margins, which limit the flow rate that can be taken in and therefore the stresses linked to the phenomena of turbulences.

It is also known to use structures that make it possible to calm the flow at the inlet of the inner enclosure 5.

The current structures have however been designed mainly to support the internal neutron instrumentation RIC of the core, and do not have optimum performance for limiting the fluctuations linked to the returning of the fluid.

GENERAL PRESENTATION OF THE INVENTION

A first purpose of the invention is to distribute the fluid in the most uniform manner towards the inlet of the core.

Another purpose is to prevent swirling flow structures (often called "vortex") in such a way as to not generate flow rate fluctuations in the assemblies.

Another purpose of the invention is to limit the mechanical constraints in the structures that support the core.

Another purpose of the invention is to increase the service life and the maintainability of the vessels.

Another purpose of the invention is to optimise the sizing of the reactor, in particular in terms of the flow rate that can be taken in by the core, in order to expand the operating ranges.

For this, the invention proposes a nuclear reactor comprising:

a. A vessel delimited by an outer wall and a vessel bottom, b. An enclosure delimited by a substantially cylindrical inner wall, the enclosure being located inside the vessel in such a way that the inner wall and the outer wall define an injection circuit with a substantially annular cross-section, the low end of the enclosure being open in such a way as to allow a fluid, injected into the injection circuit, to circulate to the vessel bottom then to penetrate and to circulate through the enclosure, c. A core located inside the enclosure, d. A support element located at the bottom of the enclosure, the support being configured to maintain control elements of the core, e. A flow diffusion element configured to make the flow entering into the enclosure uniform, the diffusion element comprising a substantially circular flat surface portion, the flat portion comprising a plurality of orifices, characterised in that the diffusion element defines a mixing zone free of any obstacle between said diffusion element and the vessel bottom, and in that the orifices all have a circular cross-section of the same diameter, and in that the flat portion is located at a first distance from the support and at a second distance from the lower limit of the vessel bottom, the second distance being greater than the first distance, the first distance being greater than ten times the diameter of the orifices.

The invention can advantageously be supplemented by one or a combination of the following characteristics:
- the diffusion element further comprises a tapered surface portion, the tapered portion extending flaring from the flat portion, the tapered portion comprising orifices similar to the orifices of the flat portion;
- the diameter of the orifices is configured to favour the flow towards the vessel bottom, to the mixing zone located facing the flat portion;
- the cross-section of the injection circuit has a thickness between three and seven times the diameter of the orifices;
- the diffusion element delimiting an intake zone between said diffusion element and the support element, the orifices are configured so that the fluid circulating in the intake zone in the vicinity of the tapered portion is aspirated by the flow circulating between the tapered portion and the vessel bottom;
- the diffusion element further comprises centring elements extending radially from the end of the tapered portion;
- the centring elements are configured to set the diffusion element in position with respect to the vessel;
- the centring elements are furthermore configured to set the diffusion element in position with respect to the enclosure.

According to a second aspect, the invention relates to a diffusion element of flow entering into a nuclear reactor core, the diffusion element comprising:
a. a wall, the wall comprising a substantially circular flat surface portion, the flat portion comprising a plurality of orifices,
b. a tapered surface portion extending from the flat portion by flaring, the tapered portion comprising a plurality of orifices,
c. centring elements,
characterised in that the orifices all have a circular cross-section of the same diameter, and in that the centring elements extend radially from the end of the tapered portion.

Optionally but advantageously, the orifices all extend along axes parallel to each other.

According to a third aspect, the invention proposes a method for calming the flow entering into the core of a nuclear reactor according to the invention, the method being carried out by putting into circulation a heat transfer fluid through the injection circuit, the fluid circulating to the vessel bottom where it is returned in such a way as to circulate through the enclosure that contains the core, characterised in that the fluid circulates between the diffusion element and the vessel bottom by running along the tapered portion, said tapered portion being configured to direct the flow towards the mixing zone, said mixing zone being a space devoid of obstacles in such a way as to optimise the returning of the flow, the flow then circulating through the diffusion element towards the intake zone, the diffusion element being configured to make the distribution of the flow rates uniform over a cross-section of the enclosure and limit the formation of swirling flow structures in the intake zone, the fluid circulating in the intake zone flowing mostly towards the enclosure, the orifices being configured so that the fluid circulating in the intake zone in the vicinity of the tapered portion is aspirated by the flow circulating between the tapered portion and the vessel bottom and is then directed towards the mixing zone, in such a way as to make the distribution of the flow rates uniform over a cross-section of the enclosure.

PRESENTATION OF THE FIGURES

Other characteristics and advantages of the invention shall further appear in the following description, which is purely for the purposes of illustration and is not limiting, and must be read with respect to the accompanying figures wherein.

DESCRIPTION OF ONE OR SEVERAL EMBODIMENTS

Figure 1:
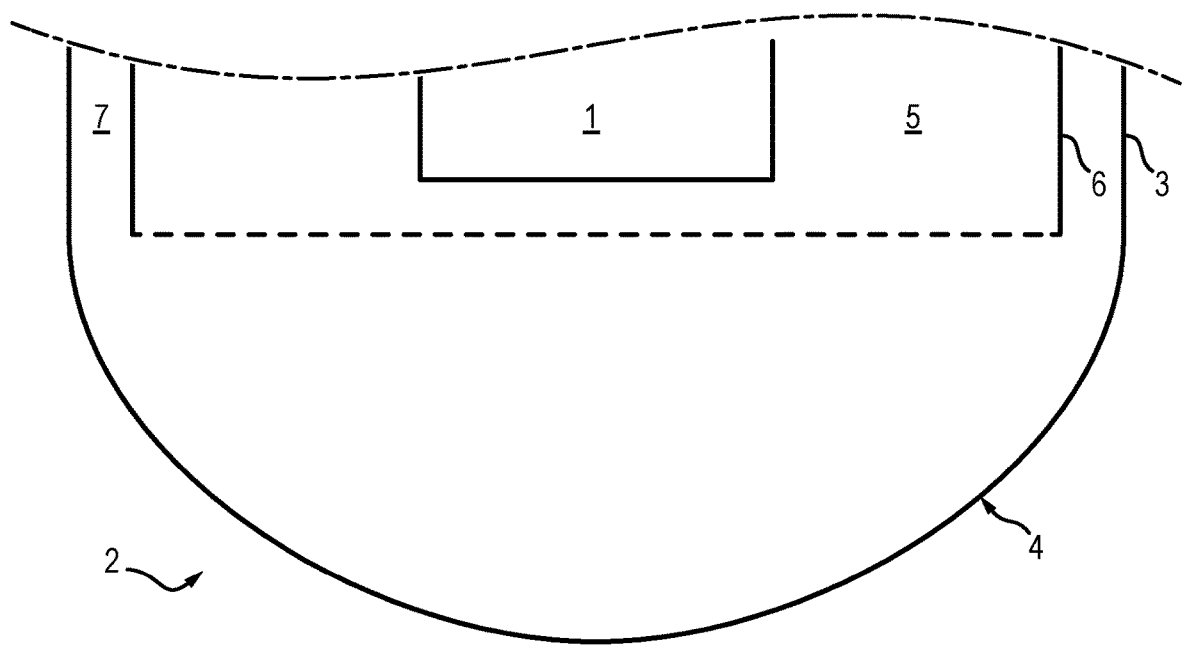
FIG. 1 is a cross-section diagram showing the main centring elements of a nuclear reactor vessel.
Figure 2:
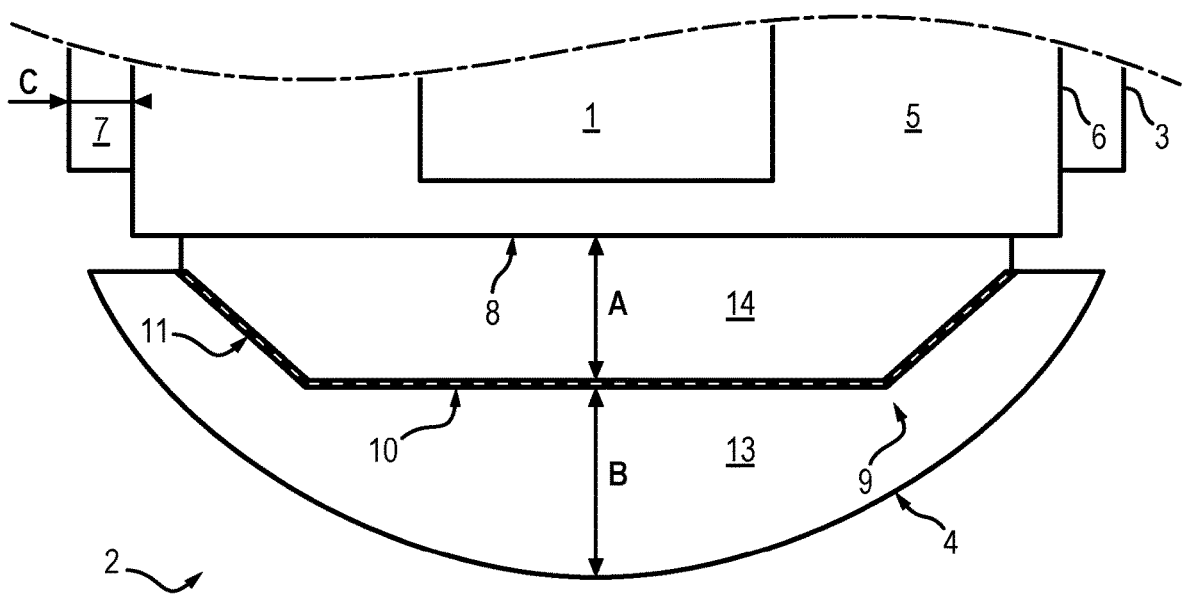
FIG. 2 is a cross-section diagram showing a flow calming assembly in accordance with the invention.

The invention applies to a flow calming assembly at the inlet of the core 1 of a nuclear reactor, said assembly, shown in FIG. 2, comprising:

a. A vessel 2 delimited by an outer wall 3 and a vessel bottom 4, b. An inner enclosure 5 delimited by a substantially cylindrical inner wall 6, the enclosure 5 being located inside the vessel 2 in such a way that the inner wall 6 and the outer wall 3 define an injection circuit 7 with a substantially annular cross-section, the low end of the enclosure 5 being open in such a way as to allow a fluid, injected into the injection circuit 7, to circulate to the vessel bottom 4 then to penetrate and to circulate through the enclosure 5, c. A core 1 located inside the enclosure 5, d. A support element 8 located at the bottom of the enclosure 5.

The support element 8 is configured to support the internal RIC (Reactor Instrumentation Core) of the core 1.

In the content of this document, the top and the bottom are defined according to the orientation of the vessel in FIG. 2, the vessel bottom 4 being located at the bottom of the vessel 2. This is in no way limiting, as the structure can apply regardless of the orientation chosen for the vessel 2 in space.

The notions of radial and axial are defined according to the longitudinal axis X along which the vessel 1 extends.

The assembly further comprises a flow diffusion element 9 configured to make uniform the flow entering into the enclosure 5.

The diffusion element 9 comprises a substantially circular flat surface portion 10 and a substantially tapered surface portion 11, the tapered portion 11 extending flaring from the flat portion 10.

In the embodiment shown, the flat portion 10 is central and the tapered portion 11 extends by flaring from the radially external limit of the flat portion 10.

The flat portion 10 and the tapered portion 11 each comprise a plurality of orifices 12.

The flat portion 10 can, in other embodiments, have a domed profile and have a non-zero curvature, with the term flat not having a limiting purpose.

The tapered portion 11 can also have a geometry in the portion of a sphere, the term tapered here not being limiting.

In the embodiment shown, the tapered portion 11 extends by flaring towards the top of the vessel 2, but it can be considered in other embodiments that a tapered portion 11 extends from the flat portion 10 towards the bottom of the vessel 2.

The diffusion element 9 delimits a zone referred to as the mixing zone 13, located between said diffusion element 9 and the vessel bottom 4, and a zone referred to as intake zone 14, located between the diffusion element 9 and the support element 8, the orifices 12 putting the mixing 13 and intake 14 zones into fluid communication.

More precisely, the mixing zone 13 is located facing the flat portion 10, between the flat portion 10 and the vessel bottom 4.

The orifices 12 all have a circular cross-section of the same diameter.

The diameter of the orifices 12 is configured to favour the flow towards the mixing zone 13.

More precisely, the orifices 12, in particular their geometry, their surface and their inclination, are configured to cause a singular load loss that makes it possible to favour or not the circulation of the fluid towards the intake zone 14 according to the direction of flow of the fluid.

For example, the orifices 12 are configured to limit the circulation of fluid towards the intake zone 14 by the orifices 12 with a tapered cross-section 11, the orientation and the diameter of the orifices 12 being configured in this zone to cause a singular load loss that is sufficiently substantial, in light of the direction of the flow between the tapered portion 11 and the vessel bottom 4, to limit the circulation of the fluid towards the intake zone 14 through the orifices 12 of the tapered portion 11.

The orifices 12 are therefore configured so that the fluid circulating in the intake zone 14 in the vicinity of the tapered portion 11 is aspirated by the flow circulating between the tapered portion 11 and the vessel bottom 4 and is then directed towards the mixing zone 13, in such a way as to make the distribution of the flow rates uniform over a cross-section of the enclosure 5.

The injection circuit 7 having a thickness C in the radial direction, the thickness C being configured according to the flow rate that can be taken in by the core 1, the diameter of the orifices 12 can for example be between 1/10 and 1/4 of the thickness C of the injection circuit 7.

In a preferred embodiment, the diameter of the orifices 12 is at least five times smaller than the thickness C of the injection circuit 7 in order to ensure that the fluid passes to the mixing zone before being directed to the lower plate of the core (8).

The flat portion 10 is located at a first distance A from the support element 8 and at a second distance B from the lower limit of the vessel bottom 4, with these distances being expressed along the axial direction.

The first distance A is configured to limit the absorption by the diffusion element 9 of radiation emitted by the core 1.

The first distance A is also configured so as to favour the reduction in swirling flow structures at the inlet of the enclosure 5.

The first distance A is configured to favour the mixing of each stream coming from each orifice 12 of the diffusion element 9.

In particular, the mixing of a stream is considered to be perfect when B=20 times the diameter of an orifice 12. The mixing of a stream is considered negligible if the first distance A is less than five times the diameter of an orifice 12.

For example, the first distance A is greater than ten times the diameter of the orifices 12, preferably greater than or equal to twelve times the diameter of the orifices 12.

The second distance B is configured to form a substantial mixing zone 13, allowing in particular for an optimum returning of the flow before passing through the orifices of the diffusion element 9, and also allows the flow to circulate preferably towards the intake zone 14 through the flat portion 10.

The second distance B is preferably greater than the first distance A, and represents for example fifteen times the diameter of an orifice 12.

Optionally, the orifices 12 all extend along axes parallel to each other.

Preferably, the mixing zone 13 is free from any obstacle, with the control elements RFI of the core being supported by the support element 8. This allows for an optimal returning of the fluid, which makes it possible to limit the formation of swirling structures and to make the distribution of the flow rates uniform over a cross-section of the enclosure 5.

In an embodiment of the diffusion element 9, each orifice 12 has a diameter between 45 mm and 70 mm, for example 56 mm, and is oriented in the vertical direction.

The distance between each orifice 12 can be between 5 mm and 25 mm, for example 10 mm, in the horizontal plane.

The flat portion 10 can have a radius between 1000 mm and 1500 mm, for example 1335 mm, and a thickness between 10 mm and 40 mm, for example 20 mm.

The flat portion 10 can comprise between 500 and 2000 orifices 12, for example 1201 orifices.

The first distance A can be between 500 mm and 1500 mm, for example 680 mm.

The second distance B can be between 500 mm and 3000 mm, for example 885 mm, i.e. 15.8 times the diameter of an orifice 12.

The thickness C of the injection circuit 7 can be between 100 mm and 1000 mm, for example 290 mm.

The tapered portion 11 can comprise between 5 and 15 rows of orifices 12 in the azimuth direction, for example 8 rows, with each one of the rows able to comprise between 100 and 200 orifices 12, for example 128 orifices 12.

The tapered portion 11 can therefore comprise between 500 and 3000 orifices 12, for example 1024 orifices 12.

The diffusion element 9 can therefore comprise between 1000 and 5000 orifices 12, for example 2225 orifices 12.

The outer radius of the support element 8 can be between 1500 mm and 3000 mm, for example 2144.7 mm.

Figure 3:
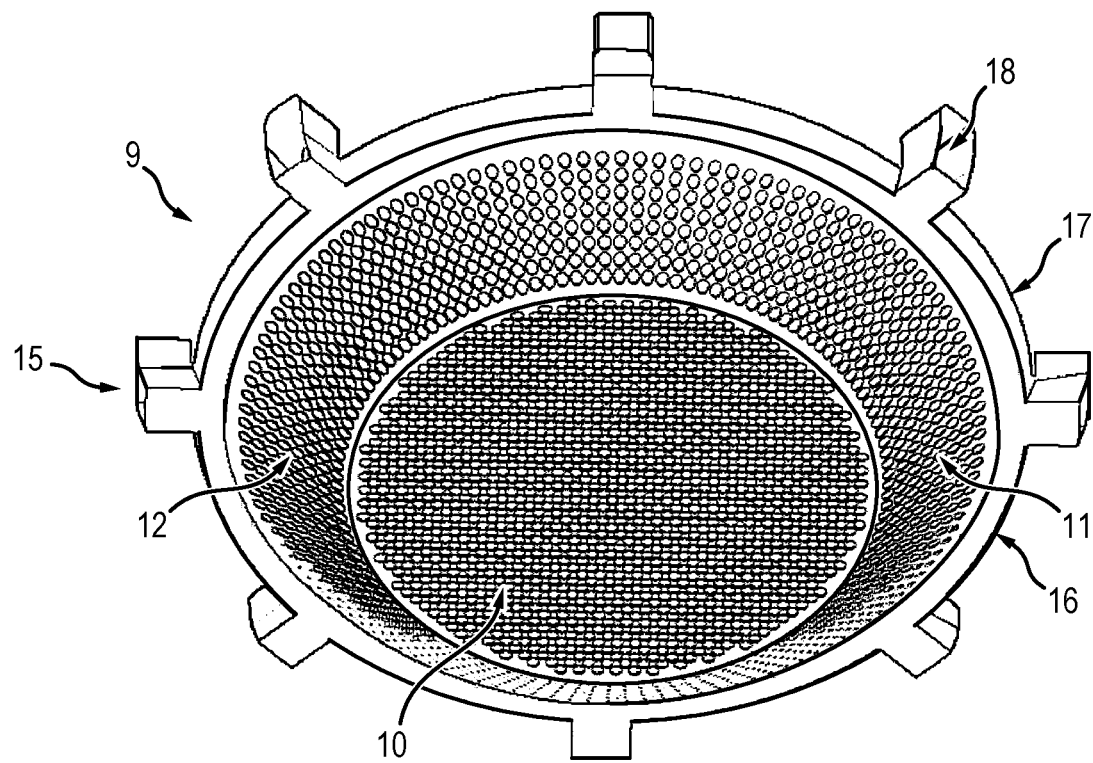
FIG. 3 is a 3D modelling of a diffusion element according to the invention.

In reference to FIG. 3, the diffusion element 9 comprises centring elements 15 extending radially from the end of the tapered portion 11.

The centring elements 15 are configured to ensure the putting into radial position of the diffusion element 9 with respect to the vessel 2.

Optionally, the centring elements 15 can also ensure the putting into radial position of the diffusion element 9 with respect to the enclosure 5 and the putting into radial position of the enclosure 5 with respect to the vessel 2.

In the embodiment shown, the centring elements 15 comprise:

a radial flange 16 extending radially from the end of the tapered portion 11, the radial flange 16 ensuring the putting into axial position of the diffusion element 9 with respect to the enclosure 5, a substantially cylindrical centring collar 17 extending axially from the end of the radial flange 16, the collar 17 ensuring the putting into radial position of the diffusion element 9 with respect to the enclosure 5, a plurality of centring tabs 18 extending radially from the end of the radial flange 16, and extending axially beyond the collar 17, the tabs 18 ensuring the putting into radial position of the diffusion element 9 with respect to the vessel 2 and also ensuring the putting into radial position of the enclosure 5 with respect to the vessel 2.

Optionally, the diameter of the diffusion element 9 represents between 50 and 100 times the diameter of an orifice 12, for example between 70 and 80 times.

This makes it possible to limit the first distance A, the second distance B and the thickness C according to the diameter of the diffusion element 9, making it possible to increase the compactness of the assembly and thus minimise its response to vibrations.

Optionally, the tabs 18 further have, at the radially external end, a geometry configured to ensure the putting into axial position of the diffusion element 9 with respect to the vessel 2 and the putting into axial position of the enclosure 5 with respect to the vessel 2.

Figure 4:
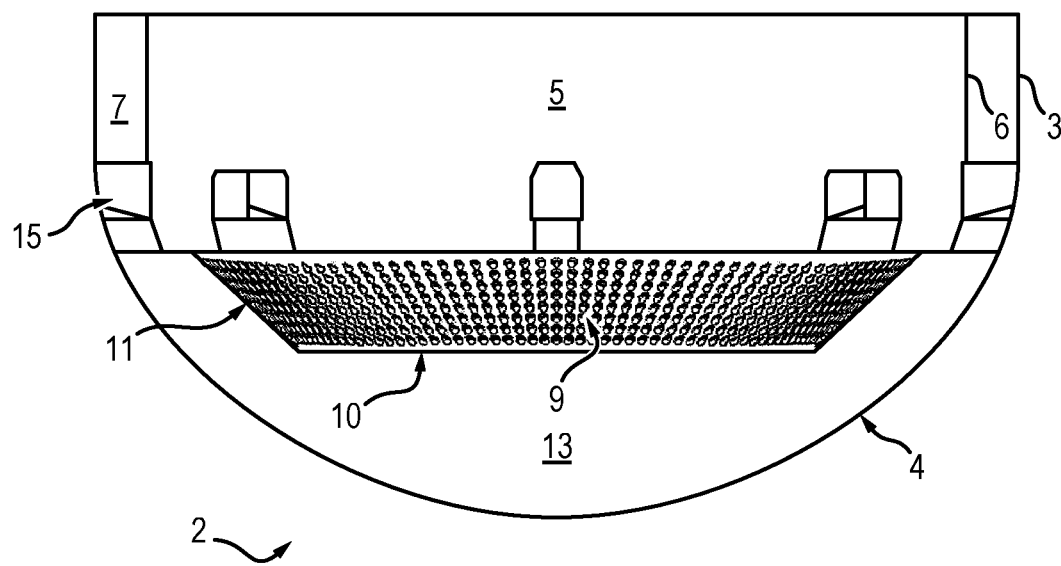
FIG. 4 is a modelling of a flow calming assembly according to the invention, with the vessel being partially open in such a way as to show the elements internal to the vessel.

As shown in FIG. 4, the tabs 18 are located at the limit between the vessel bottom 4 and the outer wall 3. The tabs 18 have a surface portion that cooperates with the inner surface of the vessel bottom 4, making it possible to carry out the setting into axial position of the diffusion element 9 and of the enclosure 5 with respect to the vessel 2.

Figure 5:
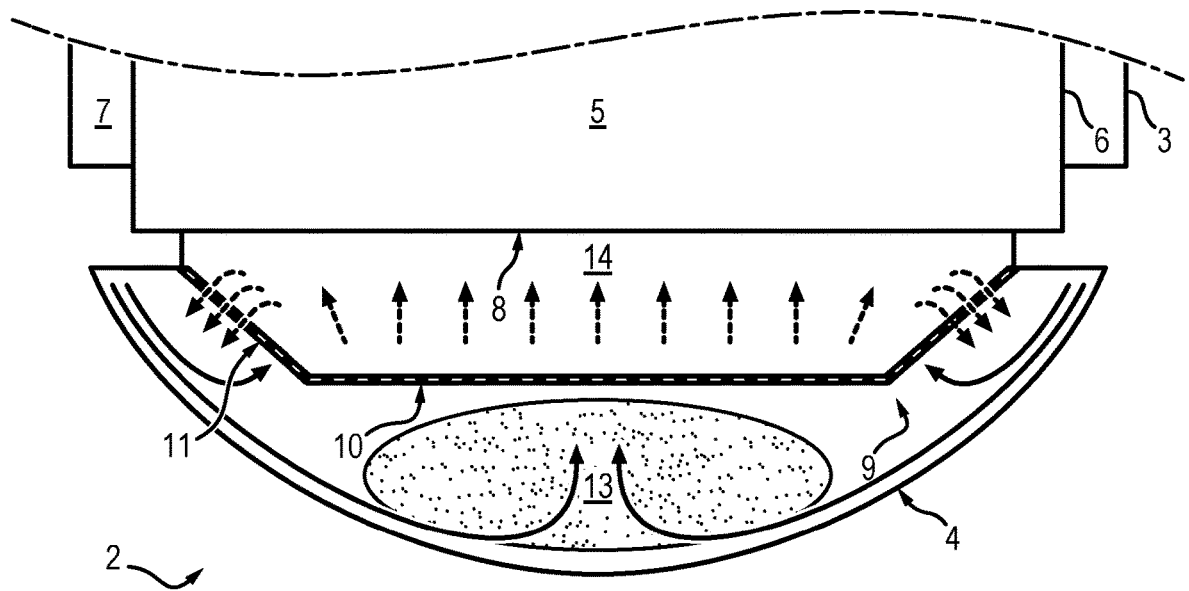
FIG. 5 is an operating diagram of a flow calming device according to the invention, showing in particular the circulation of the fluid during operation.
Figure 6:
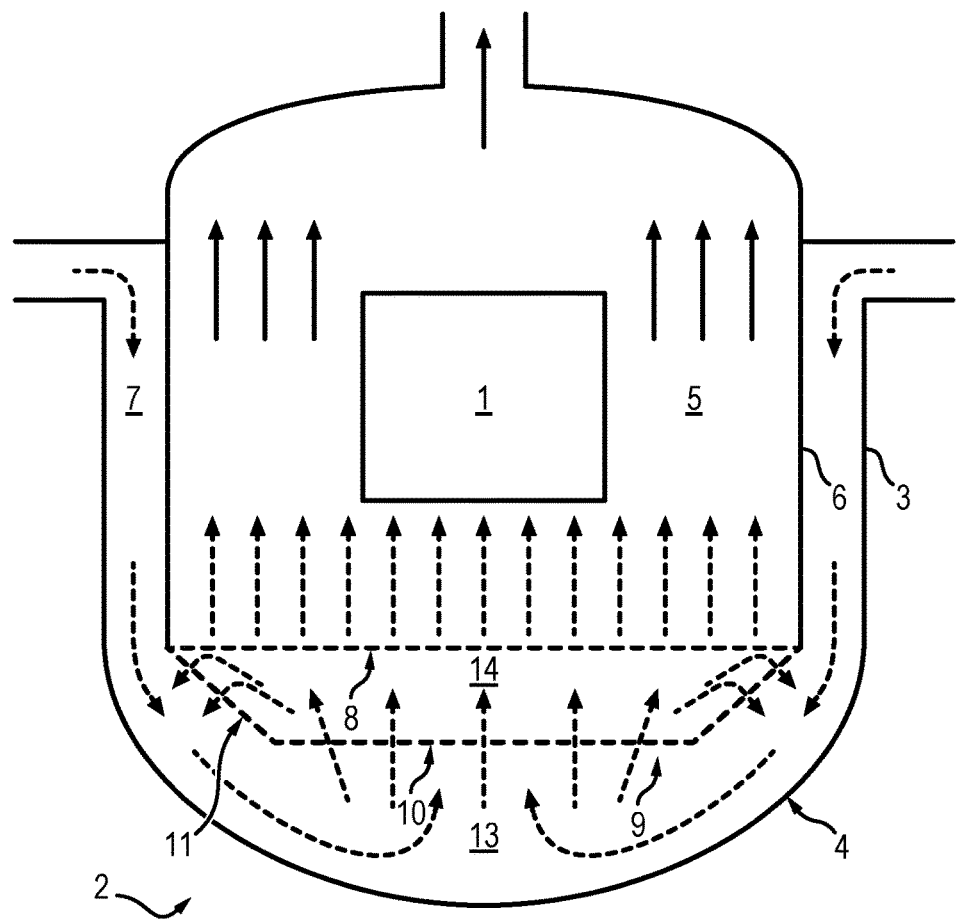
FIG. 6 is a diagram that shows a reactor according to the invention, and in particular the circulation of the fluid calmed by a method according to the invention.

In reference to FIGS. 5 and 6, the fluid circulates in the injection circuit 7 from top to bottom, and then circulates between the vessel bottom 4 and the intake element 9.

The fluid is mostly channelled to the mixing zone 13, in particular thanks to the configuration of the orifices 12 and to the load loss that they cause when the fluid circulates through the orifices 12 as soon as it exits from the injection circuit 7.

In the mixing zone 13, the fluid is returned and circulates towards the intake zone 14 through the orifices 12 of the diffusion element 9, mainly through the orifices 12 of the flat portion 10, favouring the homogeneity of the flow rates over a cross-section of the enclosure 5.

The returning of the fluid is favoured by the configuration of the second distance B, which allows for an optimum returning of the fluid and limits the presence of transversal flows while still optimising the compactness of the assembly.

In the intake zone 14, a portion of the fluid circulating in the vicinity of the tapered portion 11, in particular the top portion of the tapered portion 11, is aspirated through the orifices 12 of said tapered portion 11.

This aspiration is caused by the pressure decrease caused by the flow of the fluid exiting from the injection circuit 7 in the vicinity of the orifices 12 at the top of the tapered portion 11.

Indeed, the configuration of the orifices 12 in this zone does not favour the entry of the fluid into the intake zone 14 by said orifices 12, with the fluid therefore flowing in the vicinity of these orifices 12 and causing a pressure decrease that aspirates the fluid located in the intake zone 14 in the vicinity of said orifices.

More precisely, the ratio between the thickness C of the cross-section of the injection circuit 7 and the diameter of the orifices 12, makes it possible in particular to favour this effect.

The circulation of fluid towards the intake zone 14 by the tapered portion 11 is thus limited, which directs the flow towards the mixing zone 13 and thus favours the homogeneity of the flow rates over a cross-section of the enclosure 5.

This effect is in particular achieved by the configuration of the load losses of the orifices 12 according to the direction of the flow of the fluid.

The fluid coming from the mixing zone 13 passes through the diffusion element 9 and circulates through the enclosure 5, the attenuation of the swirling structures being favoured by the first distance A that separates the diffusion element 9 and the support element 8.

The homogeneity of the flow rates over a cross-section of the enclosure 5 makes it possible to reduce the appearance of transversal flows in the enclosure 5, and therefore makes it possible to limit the stresses that the core 1 is subjected to and therefore the premature wear of said core 1.

The service life and the yield of the assembly are improved.

The overflow phenomena at the centre of a cross-section of an enclosure 5 being limited, it is possible to increase the flow rate that can be taken in by the core 1.

The invention claimed is:

1. A nuclear reactor comprising:
   a vessel delimited by an outer wall and by a vessel bottom;
   an enclosure delimited by a cylindrical inner wall,
   the enclosure being disposed inside the vessel such that the inner wall and the outer wall define a circuit with an annular cross-section;
   a low end of the enclosure being open to allow a fluid introduced in the circuit to circulate to the vessel bottom and then to penetrate the enclosure and to circulate through the enclosure;
   a reactor core located inside the enclosure;
   a support element located adjacent a bottom of the enclosure and configured to hold control elements of the core;
   a flow diffusion element configured to provide uniform flow of the fluid entering into the enclosure,
   the diffusion element positioned between the support element and the vessel bottom,
   the diffusion element comprising a circular flat surface portion,
   the flat surface portion comprising orifices, all of the orifices having identical cross-sections;
   a space defined between the entire flat surface portion and a portion of the vessel bottom disposed beneath the entire flat surface portion forming an unobstructed mixing zone for the fluid and configured to make distribution of the flow rates uniform over a cross-section of the enclosure; and
   the flat surface portion is positioned at a first distance from the support element and at a second distance from the vessel bottom;
   the second distance being greater than the first distance,
   the first distance being greater than ten times the orifice diameter whereby the nuclear reactor is configured to induce mixing of individual fluid streams flowing from each orifice.

2. The reactor according to claim 1, wherein the first distance is greater than or equal to 12 times the orifice diameter so that the reactor is configured to drive a mixture of each stream coming from each orifice of the diffusion element.

3. The reactor according to claim 1, wherein the diffusion element further comprises a frustoconical surface portion having a diameter that increases from the flat portion, the frustoconical surface portion comprising orifices.

4. The reactor according to claim 1, wherein a cross-section of the circuit has a thickness between three and seven times the orifice diameter.

5. The reactor according to claim 1, wherein the diffusion element further comprises centering elements coupled to the frustoconical surface portion and extending radially from an end of the frustoconical surface portion.

6. The reactor according to claim 5, wherein the centering elements are configured to set the diffusion element in position with respect to the vessel.

7. The reactor according to claim 5, wherein the centering elements are configured to set the diffusion element in position with respect to the enclosure.

8. A nuclear reactor comprising:
a vessel delimited by an outer wall and by a vessel bottom;
an enclosure delimited by a cylindrical inner wall,
the enclosure being disposed inside the vessel such that the inner wall and the outer wall define a circuit with an annular cross-section;
a low end of the enclosure being open to allow a fluid introduced in the circuit to circulate to the vessel bottom and then to penetrate the enclosure and to circulate through the enclosure;
a reactor core located inside the enclosure;
a support element located adjacent a bottom of the enclosure and configured to hold control elements of the core;
a flow diffusion element configured to provide uniform flow of the fluid entering into the enclosure,
the diffusion element positioned between the support element and the vessel bottom,
the diffusion element comprising a circular flat surface portion,
the flat surface portion comprising orifices, each orifice having a circular cross-section and a disc shape defining a diameter of the orifice, all of the orifices having identical cross-sections;
a space defined between the entire flat surface portion and a portion of the vessel bottom disposed beneath the entire flat surface portion forming an unobstructed mixing zone and configured to make distribution of the flow rates uniform over a cross-section of the enclosure; and
the flat surface portion is positioned at a first distance from the support element and at a second distance from the vessel bottom;
the second distance being greater than the first distance,
the first distance being greater than ten times the orifice diameter whereby the nuclear reactor is configured to induce mixing of individual fluid streams flowing from each orifice;
the orifice diameter is between 45 mm and 70 mm; and
the flat portion has a radius between 1000 mm and 1500 mm.

9. The reactor according to claim 8, wherein a diameter of the diffusion element is more than 50 times the orifice diameter.

* * * * *